United States Patent
Dunn (10) Patent No.: US 9,243,609 B2
(45) Date of Patent: Jan. 26, 2016

(54) DENSITY ENGINES AND METHODS CAPABLE OF EFFICIENT USE OF LOW TEMPERATURE HEAT SOURCES FOR ELECTRICAL POWER GENERATION

(71) Applicant: Matthew F Dunn, Stony Brook, NY (US)

(72) Inventor: Matthew F Dunn, Stony Brook, NY (US)

(*) Notice: Subject to any disclaimer, the term of this patent is extended or adjusted under 35 U.S.C. 154(b) by 359 days.

(21) Appl. No.: 13/859,694

(22) Filed: Apr. 9, 2013

(65) Prior Publication Data

US 2014/0298796 A1    Oct. 9, 2014

(51) Int. Cl.
*F03C 1/00* (2006.01)
*F15B 7/02* (2006.01)
*F03B 17/02* (2006.01)

(52) U.S. Cl.
CPC .............. *F03B 17/025* (2013.01); *Y02E 10/20* (2013.01)

(58) Field of Classification Search
CPC ........ F03B 13/00; F03B 17/025; Y02E 10/20
USPC .......................... 60/531, 641.7, 530
See application file for complete search history.

(56) References Cited

U.S. PATENT DOCUMENTS

| | | | |
|---|---|---|---|
| 3,648,458 A * | 3/1972 | McAlister ...................... 60/415 |
| 7,987,674 B2 * | 8/2011 | Jones et al. ................. 60/641.7 |
| 8,453,443 B2 * | 6/2013 | Kim ............................. 60/496 |
| 2010/0139272 A1* | 6/2010 | Howard et al. .............. 60/641.7 |
| 2010/0146963 A1* | 6/2010 | Miller ............................ 60/531 |

* cited by examiner

*Primary Examiner* — Jorge Pereiro
*Assistant Examiner* — Deming Wan (57) ABSTRACT

Systems and methods to convert low temperature solar thermal or waste heat sources for electric power generation, by integrating available technologies with a unique, efficient combined cycle. The device consists of mobile pods immersed within a thermal sink fluid reservoir. A vapor cycle converts thermal energy to buoyant potential energy by inducing density and volume changes of the mobile pods through discrete phase changes of a refrigerant working fluid. Buoyant potential energy is then converted to electrical power through motion of the entire pod within a thermal sink pressure gradient.

17 Claims, 8 Drawing Sheets

DENSITY ENGINES AND METHODS CAPABLE OF EFFICIENT USE OF LOW TEMPERATURE HEAT SOURCES FOR ELECTRICAL POWER GENERATION

FIELD OF THE INVENTION

The present invention relates to a heat engine which generates electricity from applied buoyancy force using a thermodynamic vapor cycle, e.g., a low-temperature thermodynamic vapor cycle, to induce density changes of a working fluid within a variable volume mobile device.

BACKGROUND

Fossil fuel power generation damages the global environment and is not sustainable. However the current alternatives to fossil fuel power generation including zero-emission, renewable power systems available are prohibitively large, conspicuous, and not cost competitive with fossil fuel power generation due to high capital cost of equipment and poor energy efficiency. Existing heat engines offer cost effective power generation options in high temperature large power applications, however in low temperature, low power applications these heat engines suffer from high losses in efficiency and high capital cost per unit of power produced. Current power generation equipment is not viably applicable for the large global reserve of low temperature heat sources. These heat sources include solar thermal as well as the large amounts of waste heat arising from fossil-fuel power generation and other industrial processing. Accordingly, there exists a need to create new methods for generating electrical power from low temperature heat sources efficiently, cost effectively, and scalable for both small and large power applications.

SUMMARY

In accordance with example embodiments, this invention may offer improved energy conversion efficiency over existing turbomachinery heat engine technologies, and allow cost effective use of low power density, renewable fuel sources. Example embodiments of the present invention may provide a means to generate electrical power from low temperature heat sources. It does not require combustion to operate, and may be used in conjunction with solar thermal, for example, as a zero-emission device. The device may be cost competitive, simple to operate, and rapidly installed, converting any suitable low temperature heat source into a modular and scalable electric power supply which can be used locally as well as in conjunction with large-scale power generation, offering high operational availability. The device combines well-known thermodynamic and fluid dynamic principles with commercially available technologies in a unique and non-obvious manner, leveraging density changes occurring within a thermodynamic cycle to alter buoyancy of the heat engine device within a thermal sink fluid.

The example device generates useful work using a closed-loop vapor cycle which has been modified to incorporate two primary differences from typical heat engine applications:

1) The increase in cycle pressure on the working fluid is not induced from a compressor or pump driven by an input shaft. In addition, the reduction in cycle pressure is not induced by a turbine powering an output shaft. In this example device, cycle pressure is governed by depth of the heat engine immersed within a thermal sink fluid which has pressure differential. The entire heat engine device transitions between regions of low and high pressure thermal sink fluid, in which thermal sink fluid applies pressure force against the refrigerant working fluid via a piston or bladder within the heat engine to create pressure changes in the cycle. In this cycle, pressure difference between the working fluid and the surrounding thermal sink fluid are minimized which simplifies the design of this heat engine invention, and the absence of both compression and turbine machinery reduces capital cost of the device.

2) The shaft work used to generate power is not derived from the continuous flow of the working fluid. In this example device, there is no flow of working fluid in the cycle. Rather, an external heat source provides thermal energy to the working fluid to induce a constant pressure phase change which generates boundary work in a discrete manner. This boundary work is used to change the volume, and thus density, of the overall heat engine relative to the surrounding thermal sink fluid density, generating buoyant potential energy. The use of discrete phases rather than continuous flow phase changes improves device efficiency at the lower pressure ratios and temperatures often present in waste heat source power conversion, by avoiding flow losses that predominate in turbine devices operating under these operating conditions. In this example device, the shaft work used to generate power is generated through the conversion of this buoyant potential energy to mechanical energy through applied buoyant force which moves the entire heat engine device from high pressure region of the thermal sink fluid to the low pressure region of the thermal sink fluid. In this cycle, the effective weight of the heat engine fully immersed in thermal sink fluid is not constant due to the effect of buoyancy, which allows for net positive conversion of potential energy to mechanical energy across the cycle.

These two differences from typical vapor cycle heat engine may provide significant efficiency and cost advantages over existing heat engines operating in low temperature and low power density applications.

In accordance with example implementations, a method for generating energy using a thermal cycle is provided, the method including: heating and maintaining the temperature of a first volume of a thermal exchange fluid at a level greater than the highest temperature of the thermal cycle, the heating provided via an external heat source configured to transfer heat to the volume of thermal exchange fluid when the volume of thermal exchange fluid is disposed within a stationary insulated heat reservoir that is stationary with respect to a thermal sink; maintaining a temperature of the thermal sink at a temperature lower than the lowest temperature of the thermal cycle, the thermal sink comprising a second volume of the thermal exchange fluid and having a high pressure region and low pressure region, the stationary insulated heat reservoir being disposed in the low pressure region of the thermal sink; circulating the thermal exchange fluid between the low temperature thermal sink and the high temperature stationary insulated heat reservoir; transferring high temperature thermal exchange fluid from the stationary insulated heat reservoir to an insulated thermal tank of a first mobile device disposed in the low pressure region of the thermal sink; after transferring the high temperature thermal exchange fluid to the insulated thermal tank, moving the first mobile device along a defined path to the high pressure region of the thermal sink, the movement of the first mobile device being actuated via at least one of (a) a weight of the first mobile device and (b) a corresponding countermovement of a second tandem mobile device from the high pressure region of the thermal sink to the low pressure region of the thermal sink; after moving the first mobile device to the high pressure region of the thermal sink, transferring at least a portion of the high temperature thermal exchange fluid from the insulated thermal tank of the first mobile device to a heat exchanger disposed in a variable volume insulated phase-change tank of the first mobile device, thereby heating a refrigerant disposed in the variable-volume insulated phase-change tank, the heating of the refrigerant causing at least a portion of the refrigerant to change from a liquid phase to a vapor phase, the change of the refrigerant from the liquid phase to the vapor phase causing the volume of the variable-volume insulated phase-change tank to increase, this expansion exerting work on thermal sink, thereby reducing the density and increasing the volume of the first mobile device to provide a buoyant force to cause the first mobile device to move from the high pressure region of the thermal sink to the low pressure region of the thermal sink; generating electrical energy from the movement of the first mobile device from the high pressure region of the thermal sink to the low pressure region of the thermal sink; transferring low temperature thermal exchange fluid from the high pressure thermal sink to the insulated thermal tank of the first mobile device prior to the first mobile device reaching the low pressure region of the thermal sink; and after the movement of the first mobile device from the high pressure region of the thermal sink to the low pressure region of the thermal sink, transferring at least a portion of the low temperature thermal exchange fluid from the insulated thermal tank of the first mobile device, in addition to some portion of low temperature thermal exchange fluid from the thermal sink to the heat exchanger, thereby cooling the refrigerant to cause at least a portion of the refrigerant to change from a vapor phase to a liquid phase, the change of the refrigerant from the vapor phase to the liquid phase causing the volume of the variable-volume-insulated phase-change tank to decrease, thereby reducing the volume and increasing the density of the first mobile device to remove buoyancy force and facilitate movement of the first mobile device from the low pressure region of the thermal sink to the high pressure region of the thermal sink after high temperature thermal exchange fluid is again transferred from the stationary insulated heat reservoir into the insulated thermal tank of the first device.

In accordance with example implementations, a system configured to operate according to a thermal cycle includes: a thermal exchange fluid; a heating mechanism configured to heat and maintain a temperature of a first volume of the thermal exchange fluid at a level greater than the highest temperature of the thermal cycle, the heating mechanism including an external heat source configured to transfer heat to a volume of thermal exchange fluid stored within a stationary insulated heat reservoir; a thermal sink comprising a second volume of the thermal exchange fluid with a pressure differential maintained at a temperature lower than the lowest temperature of the thermal cycle, which encloses the stationary insulated heat reservoir containing high temperature thermal exchange fluid within a low pressure region of the thermal sink, and is configured to allow circulation of thermal exchange fluid between the low temperature thermal sink and the high temperature stationary insulated heat reservoir as part of a closed thermodynamic cycle; a mechanism configured to maintain an orientation of the stationary insulated heat reservoir containing high temperature thermal exchange fluid with open bottom facing the region of higher pressure of thermal sink; a mechanism configured to limit heat transfer between the high temperature thermal exchange fluid stored in the stationary insulated heat reservoir and the low temperature thermal exchange fluid in the surrounding thermal sink through the open bottom of the stationary insulated heat reservoir; a mobile device configured to move within the volume of thermal sink via a defined linear path through the pressure gradient between the stationary insulated heat reservoir enclosed within the low pressure region, and some defined depth within the higher pressure region determined by the high pressure point of the thermodynamic cycle, the mobile device including an insulated thermal tank configured to carry either, (a) a volume of the high temperature thermal exchange fluid from the stationary insulated heat reservoir in the low pressure region of the thermal sink to the high pressure region in the thermal sink, or (b) a volume of low temperature thermal exchange fluid from the thermal sink in the high pressure region of the thermal sink to the low pressure region in the thermal sink, an insulated phase-change tank of fixed volume which contains a variable volume reservoir capable of minimally restrained volumetric expansion and contraction which acts as a closed boundary between (a) a fixed mass of refrigerant and a heat exchanger configured to transfer heat between a volume of circulating thermal exchange fluid and the fixed mass of refrigerant to induce phase change of the refrigerant between liquid and vapor states, and (b) a volume of low temperature thermal exchange fluid which enters and exits the insulated phase-change tank from the thermal sink with minimal restraint in inverse proportion to the variable volume reservoir expansion and contraction, an insulated regenerator tank which captures and carries a portion of the volume of thermal exchange fluid exiting the heat exchanger disposed within the insulated phase-change tank between the low and high pressure regions of the thermal sink for improved efficiency, a ballast tank which is used to ensure that the mobile device has a net density equal to or greater than the surrounding thermal sink when the refrigerant is in liquid state, while also ensuring that the mobile device has a net density less than the surrounding thermal sink when the refrigerant is in vapor state, a transfer mechanism configured to circulate the high temperature thermal exchange fluid (a) from the stationary insulated heat reservoir into the insulated thermal tank in region of low pressure thermal sink, and then (b) contain high temperature thermal exchange fluid within the insulated thermal tank as it moves from the low pressure region to high pressure region of thermal sink, and then circulate high temperature thermal exchange fluid (c) from the insulated thermal tank into and through the heat exchanger disposed within the insulated phase-change tank to complete a phase change of the refrigerant from liquid to vapor, and (d) lower temperature thermal exchange fluid from the outlet of the heat exchanger to the insulated regenerator tank, a transfer mechanism configured to circulate the low temperature thermal exchange fluid (a) from the thermal sink into the insulated thermal tank in region of high pressure thermal sink, and then (b) contain low temperature thermal exchange fluid within the insulated thermal tank as it moves from the high pressure region to low pressure region of thermal sink, and then circulate low temperature thermal exchange fluid (c) from the insulated thermal tank, in addition to some portion of low temperature thermal exchange fluid from the thermal sink into and through the heat exchanger disposed within the insulated phase-change tank to complete a phase change of the refrigerant from vapor to liquid, and (d) higher temperature thermal exchange fluid from the outlet of the heat exchanger to the insulated regenerator tank, and a closed loop flow path which allows thermal exchange fluid to pass freely (a) between the insulated regenerator tank of the mobile device to the low temperature thermal sink, and then (b) from the low temperature thermal sink to the high temperature stationary insulated heat reservoir; a mechanism configured to transmit the buoyant force acting on the mobile device during ascent between region of high pressure thermal sink to the region of low pressure thermal sink to a generator configured to convert motion to electrical power; a mechanism configured to prime the system by moving the mobile device from the low pressure region of thermal sink to the high pressure region of thermal sink through application of either (a) force weight from the ballast tank, or (b) tension force provided by a second tandem mobile device connected to the first mobile device via cable and pulley; and a mechanism configured to stop the ascent of the mobile device when the insulated thermal tank is fully enclosed within the stationary insulated heat reservoir while the insulated phase-change and insulated regenerator tanks remain external to the stationary insulated heat reservoir within the low pressure region of the thermal sink.

The volume of fluid with a pressure differential may be a liquid.

The system may further include a cable-and-pulley system configured to transmit the buoyant motion of the mobile device to an input of the generator.

The tandem system mobile device may be a first mobile device, the system further comprising a second tandem mobile device, wherein movement of the first mobile device in a first direction along the cable-and-pulley system causes movement of the second tandem mobile device in a second direction along the cable-and-pulley system, the first second direction being opposite the first direction.

The generator may be a linear generator coupled to the mobile device.

The linear generator may surround the mobile device via a thermal sink enclosure.

The buoyant motion of the mobile device may be transmitted to the generator via at least one of a propeller and a turbine.

The generator may be disposed in the mobile device.

The generator may be connected to a pump and the generator is powered by the movement of fluid passing over the mobile device as the mobile device moves within the thermal sink.

The generator may be configured to translate relative movement between the mobile device and any stationary position into electromagnetic power generation.

The mobile device may not contain a regenerator tank, whereby the thermal exchange fluid is transferred directly from the outlet of the heat exchanger to the thermal sink.

The heat exchanger may include thermal exchange fluid contained within a tube enclosed by refrigerant.

The heat exchanger may include refrigerant contained within the variable volume reservoir surrounded by thermal exchange fluid.

The heat exchanger may contain refrigerant contained inside a tube within the variable volume reservoir surrounded by thermal exchange fluid.

The pressure differential within the thermal sink may be generated through the application of gravity in a vertical configuration of the system.

The pressure differential within the thermal sink may be generated though application of centrifugal force generated by rotating a closed volume of the thermal sink in a horizontal configuration of the system.

The transfer of thermal exchange fluid within the mobile device may be generated via at least one circulation pump contained within the mobile device.

The transfer of thermal exchange fluid within the mobile device may be generated via at least one plunger acting against at least one container wall of the thermal sink.

Multiple mobile devices may be operated together to generate a collective electrical power.

The ballast tank may be used to facilitate cold-start capability of a tandem system by ensuring the first mobile device has a net density less than the surrounding thermal sink fluid with its refrigerant is in liquid state, but maintains greater net density than the second tandem mobile device with its refrigerant in vapor state.

In accordance with example implementations, example devices may be operated at low temperatures, slow speeds, and/or very low delta pressures, which reduces the cost of heat engine machinery and improves cycle efficiency by minimizing thermodynamic cycle irreversibilities which predominate in low temperature and low flow applications with direct coupling between circulating working fluid and power generation machinery. The relatively simple design of the example device may provide reduced capital cost of heat engine machinery and faster installation, permitting cost effective scalable application to both low and high power applications, for example.

In accordance with example implementations, example devices are hybrid and may convert any suitable type external heat source to useable work, and may offer advantages over existing turbomachinery heat engine devices when used in conjunction with low temperature heat, due to its higher efficiency of energy conversion. Any suitable thermal exchange fluid may be used to transfer heat from any external heat source to the high temperature reservoir used by the device. The device is capable, in at least some implementations, of economically utilizing solar thermal energy in a zero, or substantially zero, particulate/noise/waste emission, non-combustion application, operating with no substantial impact on the environment with water comprising both the thermal exchange and thermal sink fluid in some examples.

In accordance with example implementations, example devices may assume a functional form that allows for a very small surface footprint, while providing for a large operational volume hidden either below the surface of a body of water or below ground level within reservoirs or casings filled with fluid. This small visible size provides improved visual appeal for the example device over existing environmentally-friendly power generation equipment such as photovoltaic solar panels and wind turbines, which all require large surface area footprints to generate sufficient power from low power density energy sources. In addition, the slow operational speed in some implementations, e.g., the example device of FIG. 1 and FIG. 2, combined with minimal machinery which operates below the surface allows for a device that is effectively silent. Silent or inaudible operation and small visible footprint may enable improved public perception, and may permit symbiotic operation among adjoining residential populations. Moreover, the small visible footprint and lack of appreciable noise may allow the device to comply with zoning regulations and/or local or community rules or residential codes.

In accordance with example implementations, example devices may integrate with currently available, existing technologies which allow the generation of electrical power from mechanical energy conversion. The example device may easily integrate with most existing power generation equipment, and may also be operated in conjunction with large utility power plants converting a portion of waste heat, which is currently exhausted to environmental heat sinks, into electrical power in a combined cycle application.

Further features and aspects of example embodiments of the present invention are described in more detail below with reference to the appended Figures.

DETAILED DESCRIPTION

The term "Mobile Pod" is used interchangeably with "Mobile Device" herein to mean the enclosure of the portion of the device containing the refrigerant working fluid which changes density and volume and transitions alternately between regions of high and low pressure within the thermal sink to produce work to generate electrical power The term "Thermal Exchange Fluid" will be abbreviated as (TEF), and is used herein to mean the fluid that comprises the thermal sink within which the mobile pod operates, used to either add or remove heat from the refrigerant working fluid to induce phase change.

The term "Thermal Tank" is used herein to mean an insulated tank within the mobile pod which contains either high or low temperature TEF.

The term "Phase-change Tank" is used herein to mean an insulated fixed volume tank containing a variable volume reservoir within the mobile pod which contains a heat exchanger and a refrigerant.

The term "Heat Reservoir" is used herein to mean an insulated reservoir of high temperature TEF which is held stationary within the thermal sink and maintained at high temperature through interface with an external heat source The term "Density Engine" is used herein to describe the heat engine device as a whole, which converts thermal energy to potential energy to kinetic energy to electrical energy using: one or more mobile pods interfacing with an electrical generator, one or more stationary heat reservoirs interfacing with an external heat source, and a volume of thermal sink fluid with pressure differential which encloses all mobile pods, through full range of travel, and all stationary heat reservoirs.

Figure 1A:
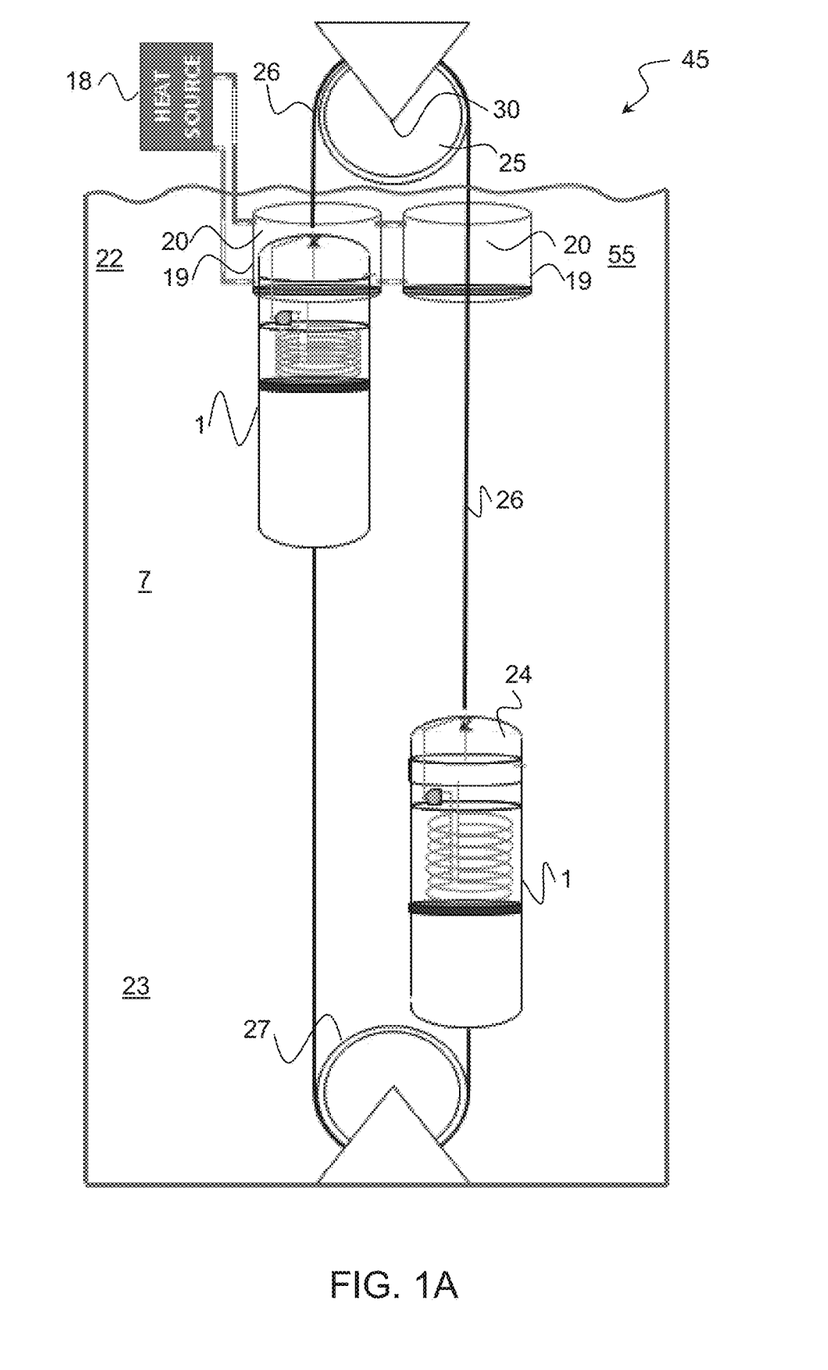
FIG. 1A shows an example heat engine device having a vertical configuration.
Figure 2:
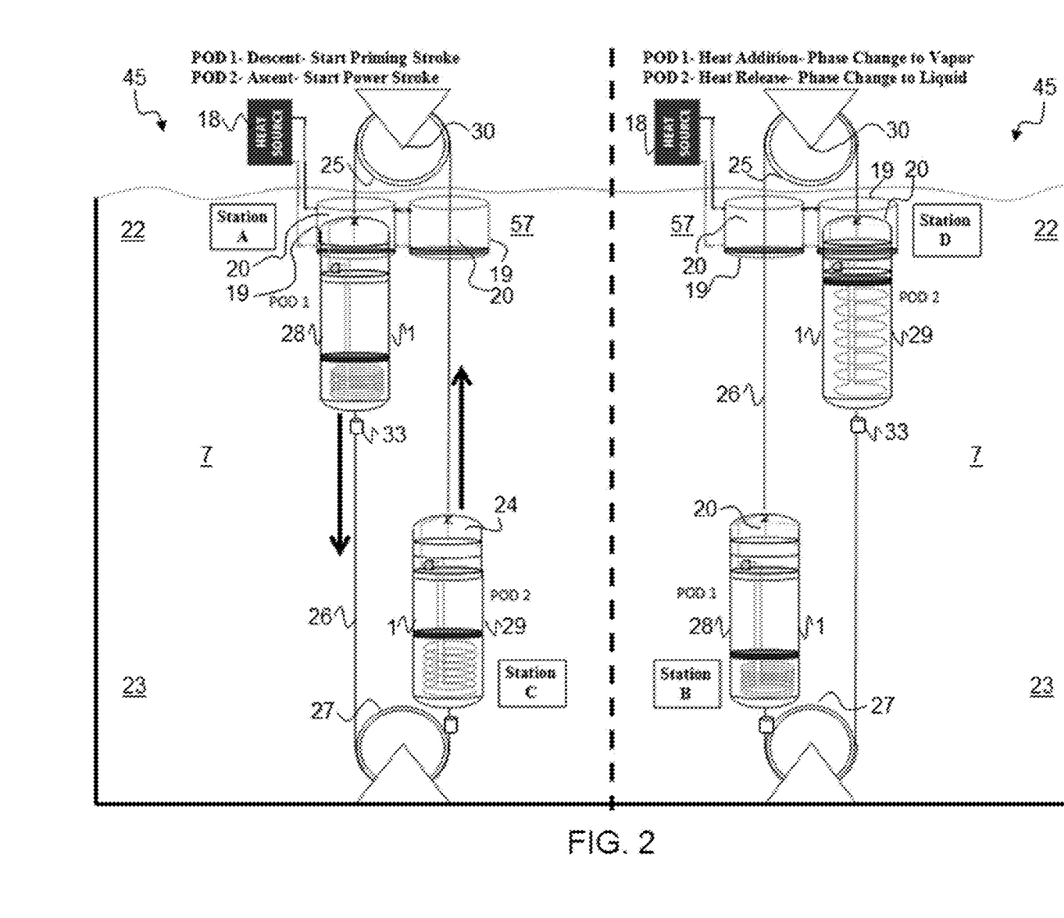
FIG. 2 depicts a system view of the heat engine of FIG. 1A working in tandem in vertical configuration within an open body of water
Figure 3:
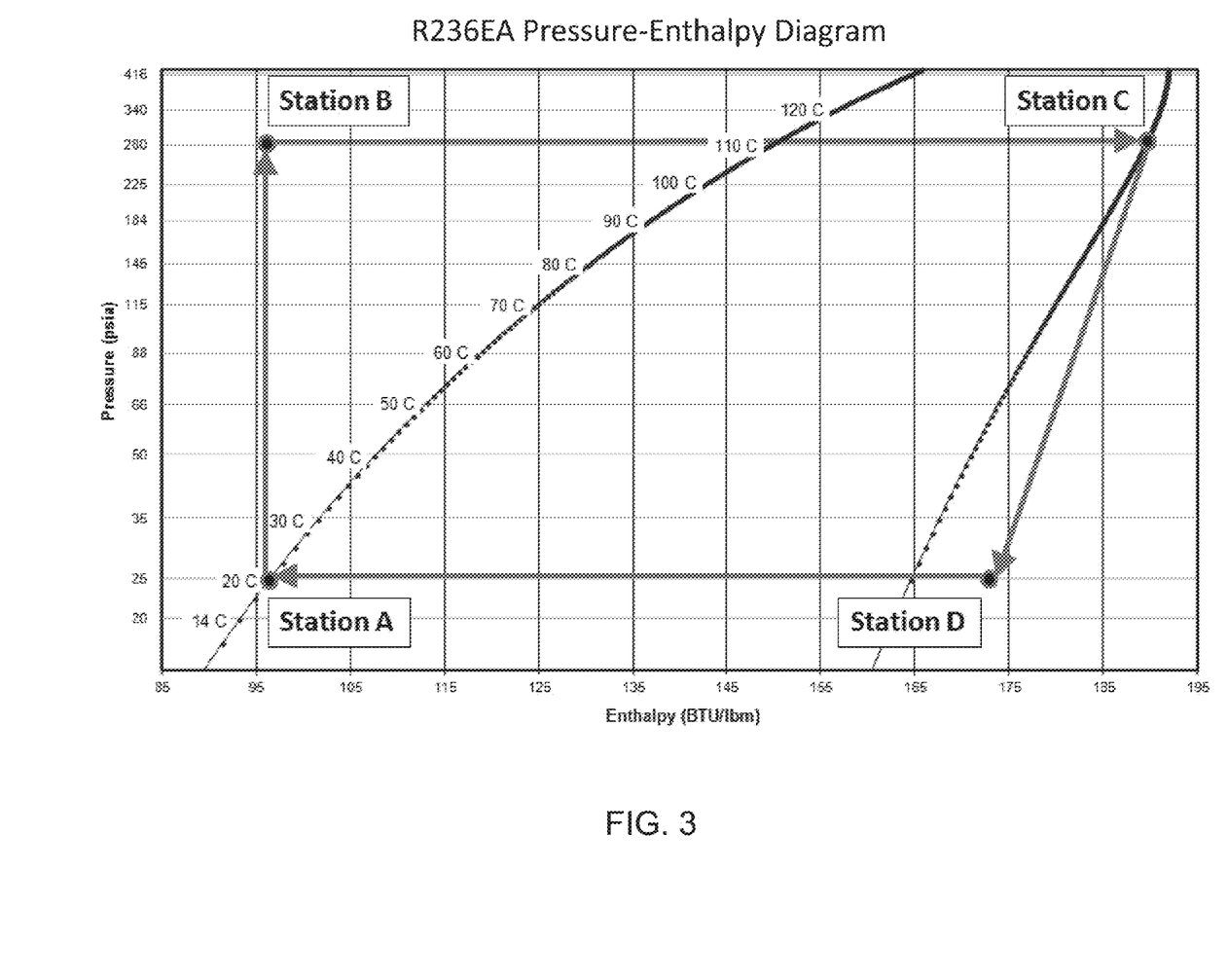
FIG. 3 shows the system operation of the heat engine device of FIGS. 1A and 2 aligned with a pressure-enthalpy diagram of the vapor cycle
Figure 4:
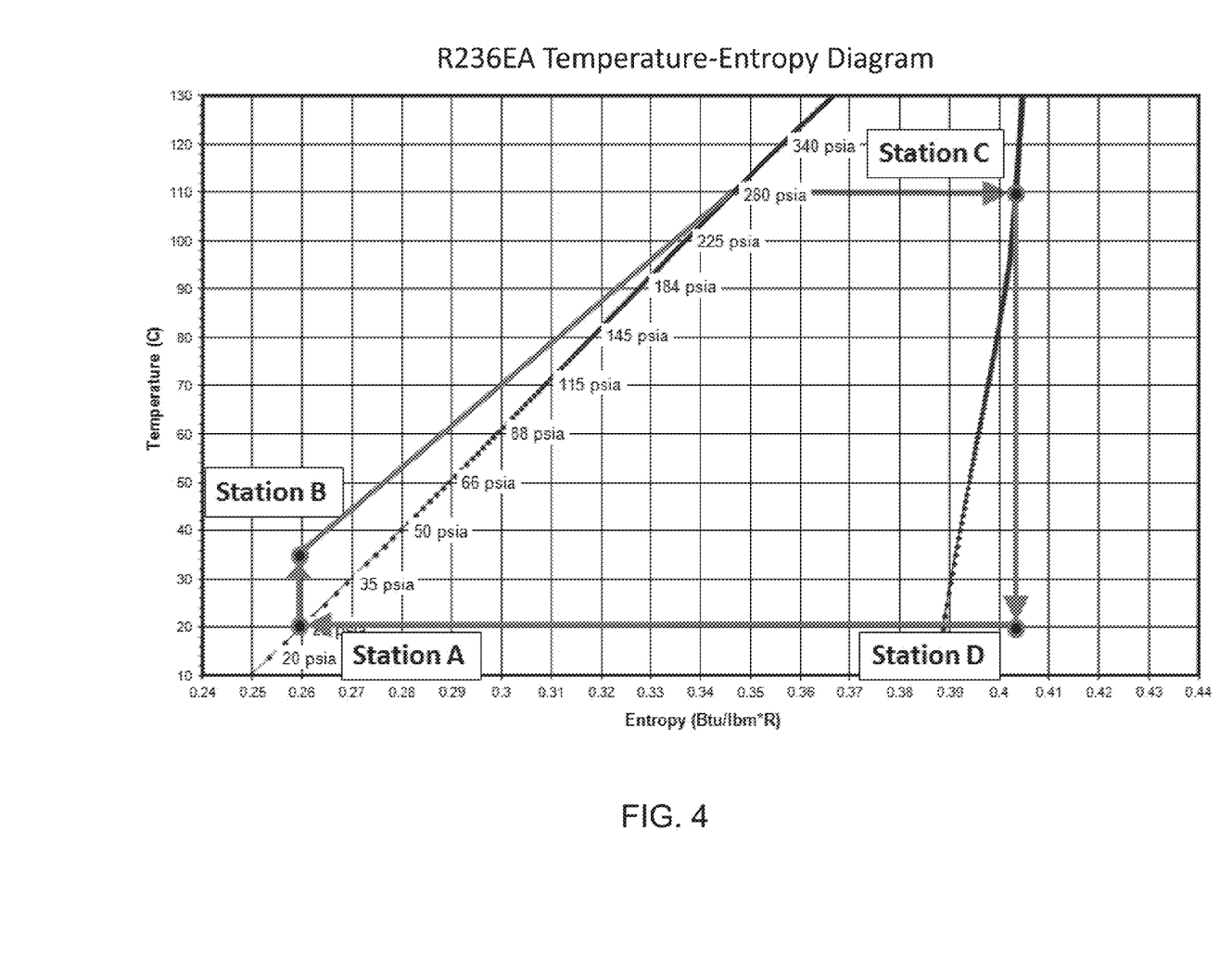
FIG. 4 shows the system operation of the heat engine device of FIGS. 1A and 2 aligned with a temperature-entropy diagram of the vapor cycle.

The following description describes, inter alia, operation corresponding to a density engine 45 as illustrated in FIG. 1A, for example, the vertical configuration density engine 45 in an open water environment with a cable pulley arrangement of two mobile pods 28 and 29 operating in tandem as shown in FIG. 2, the following stationary positions align to the thermal cycle as shown in FIG. 3 and FIG. 4, which identify the cycle state points on both pressure/enthalpy and temperature/entropy diagrams respectively. Stations A to D are described below.

Station A: Mobile device 1 is stationary near surface in thermal sink low pressure region 22 at lowest pressure in cycle, refrigerant 4 is cold liquid within the phase-change tank 3, with variable volume reservoir 5 contracted to minimum volume, and the density of the mobile device 1 is equal to the density of the thermal sink 7 while thermal tank 2 of the mobile pod 28 is held within the stationary heat reservoir 19 and filled with high temperature TEF 20.

Station B: Mobile device 1 is stationary at depth in thermal sink high pressure region 23 at highest pressure in cycle, refrigerant 4 is cold liquid within the phase-change tank 3, with variable volume reservoir 5 contracted to minimum volume, and the density of the mobile device 1 is equal to thermal sink 7 density while thermal tank 2 is within the thermal sink 7 and contains high temperature TEF 20.

Station C: Mobile device 1 is stationary at depth in thermal sink high pressure region 23 at highest pressure in cycle, refrigerant 4 is hot vapor within the phase-change tank 3, with variable volume reservoir 5 expanded to a larger volume, and the density of mobile device 1 is less than the density of the thermal sink 7, while thermal tank 2 is within the thermal sink 7 and filled with low temperature TEF 24.

Station D: Mobile device 1 is stationary near surface in thermal sink low pressure region 22 at lowest pressure in cycle, refrigerant 4 is hot vapor within the phase-change tank 3, with variable volume reservoir 5 expanded to maximum volume, and the density of mobile device 1 is less than the density of thermal sink 7 while thermal tank 2 is held within the stationary heat reservoir 19 and contains low temperature TEF 24.

Figure 1B:
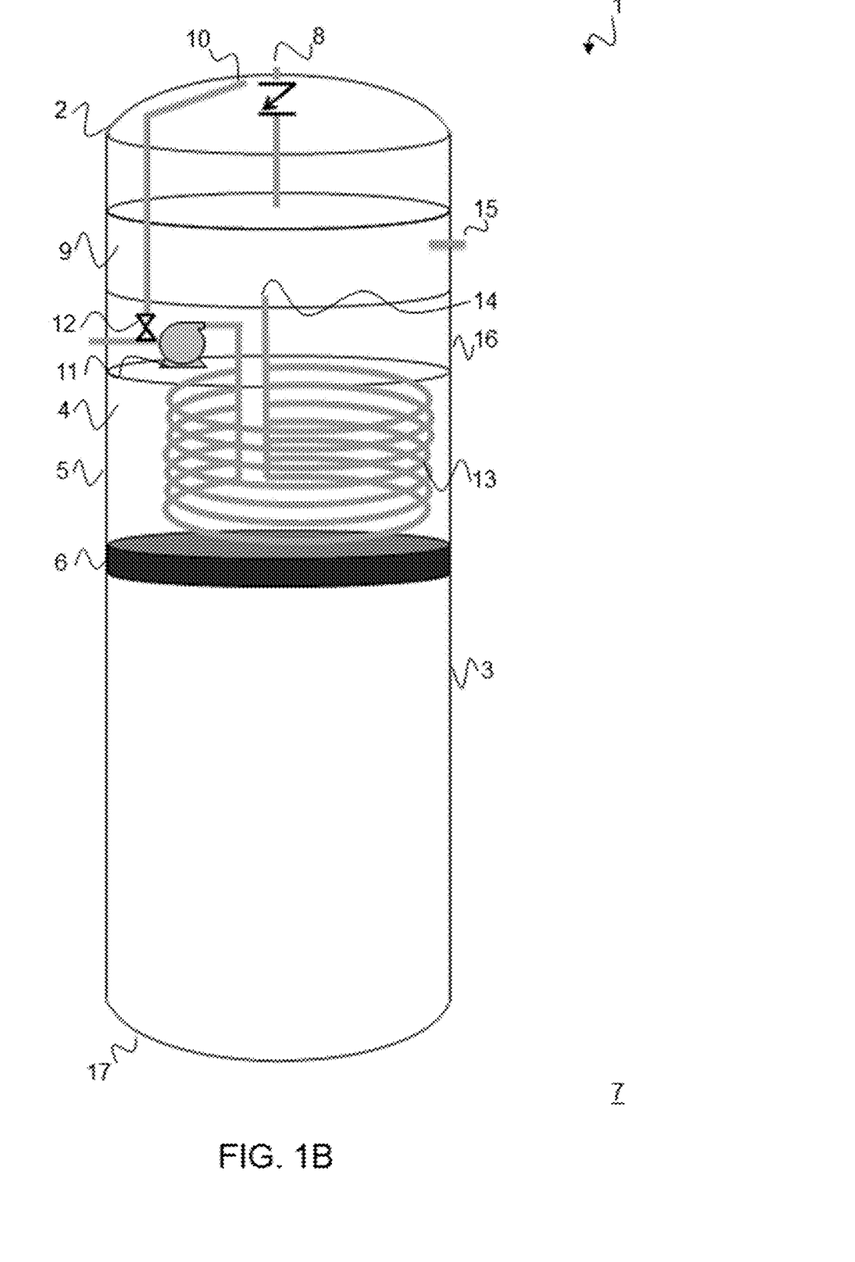
FIG. 1B shows a detail view of a mobile device of the heat engine device illustrated in FIG. 1A.
Figure 1C:
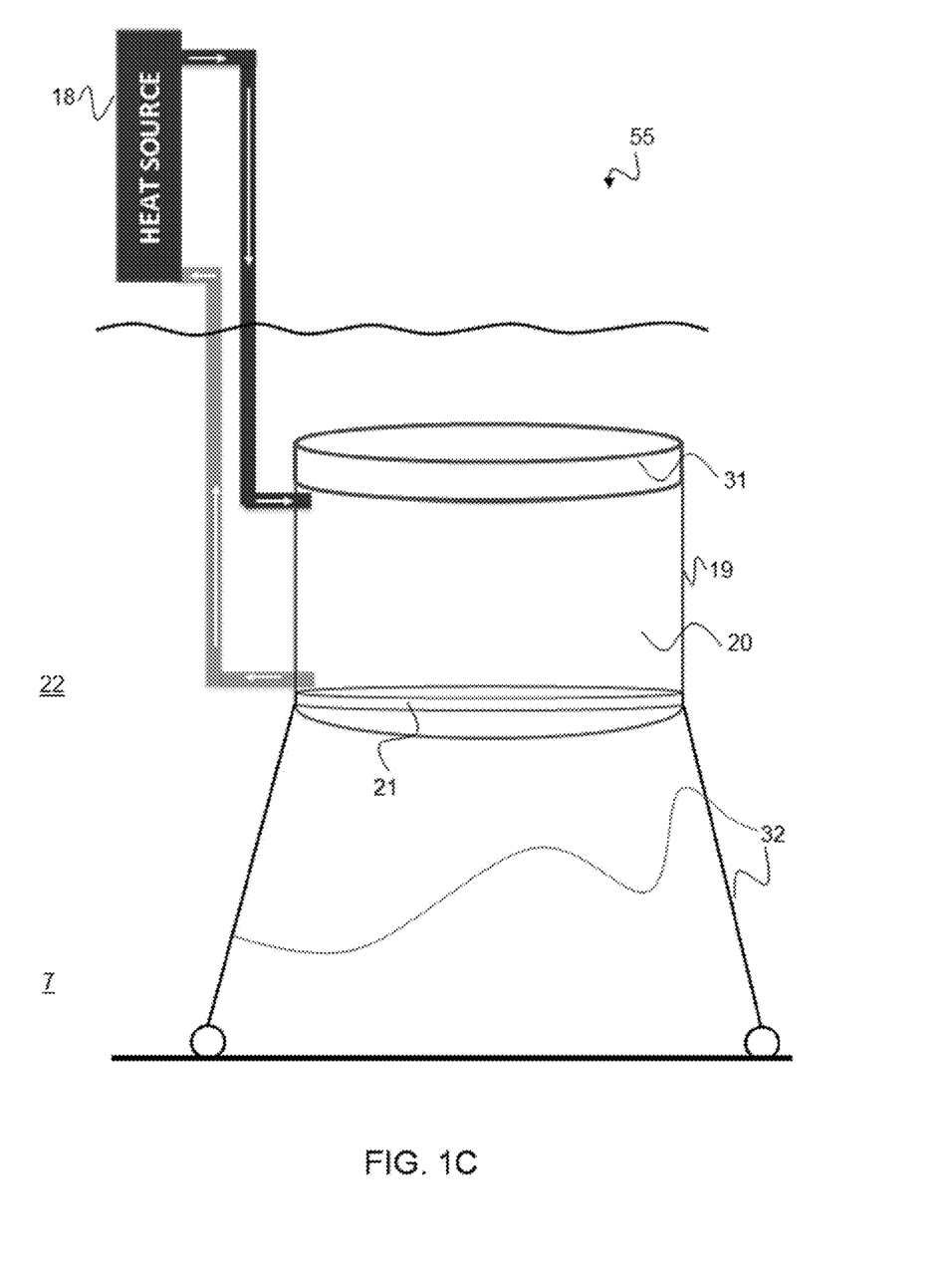
FIG. 1C shows a detail view of a heat source mechanism of the heat engine device illustrated in FIG. 1A.

FIG. 1B shows detail of a mobile device 1, which corresponds to the same structure of both a first pod 28 and a second pod 29 as illustrated in FIG. 2. FIG. 1C shows a heat source mechanism 55. Heat source mechanism 55 is the same as the heat source mechanism 57 shown in FIG. 2, except that the heat source 57 in FIG. 2 has two high temperature reservoirs 19 attached to external heat source 18. FIG. 1A shows an overall view of the density engine 45 which includes both mobile device 1 and heat source mechanism 55, as shown in FIGS. 1B and 1C respectively, aligned in assembly view.

Referring to FIG. 2, for the illustrated example identifies how the tandem mobile pods 28 and 29 transition between these station points which allows the density engine 45 device to convert thermal energy to electrical power. The operation is described from the view of first pod 28, however it should be noted that both first pod 28 and second pod 29 complete the cycle in the same manner but are offset by two station points at all times.

The density engine 45, as shown in FIGS. 1A and 2, includes a thermal sink 7 which is a large volume of low temperature TEF 24, an external heat source 18 and electrical generator 30, a stationary insulated heat reservoir 19 located within the thermal sink 7 which contains high temperature TEF 20, and two mobile pods 28 and 29, which contain refrigerant 4 working fluid, connected together via cable 26 via pulleys 25 and 27.

The first pod 28 is connected to the second pod 29 via a cable 26 which extends around an upper pulley 25 and a lower pulley 27 allowing free movement of each pod within a thermal sink 7 between a thermal sink low pressure region 22 and a thermal sink high pressure region 23.

Cable 26, upper pulley 25 and lower pulley 27 transfer force between the first pod 28, the second pod 29, and the electrical generator 30 which may have an input shaft coupled to the upper pulley 25. Thus, rotation of the pulley due to the action of the pods 28 and 29 pulling the cable 26 coupled to the pulley 25 causes the input shaft to rotate, thereby converting the mechanical movement of the pods 28 and 29 into electrical energy. Although the generator 30 is driven via rotation of the upper pulley 25, it should be understood that the upper pulley 25 and/or the lower pulley 27 may be coupled to one or more generators to generate electricity. In the illustrated example, the generator is turned in alternating rotational directions as the mobile pods 28 and 29 rise, respectively.

Cable 26, upper pulley 25, and lower pulley 27 operate such that the pods to not contact each other as they travel between thermal sink low pressure region 22 and thermal sink high pressure region 23.

Cable 26, upper pulley 25, and lower pulley 27 operate such that as the first pod 28 moves from Station A to Station B the second pod 29 moves from Station C to Station D at the same time and rate. It should be understood, however, that in some example implementations, one or more pods may be configured to move at different times and/or rates.

Cable 26 may have one or more cable stops 33 to prevent the pods from contacting the pulleys 25 and 27 and stop the ascent of the pods 28 and 29 at the set depth to ensure thermal tank 2 fully immersed within the stationary heat reservoir 19.

Mobile device 1 has ballast tank 16 to ensure neutral buoyancy from Station A through Station B. It should be understood, however, that in some other example implementations, one or more mobile devices 1 may be ballasted so that there is negative buoyancy from Station A through Station B due to greater pod density than surrounding thermal sink 7 fluid density.

TEF circulation pump 11 is powered by via external power transmitted through cable 26, although any suitable power transfer mechanism may be implemented.

Stationary heat reservoir 19 is connected to the external heat source 18 through insulated piping which maintains a constant temperature of the high temperature TEF 20 within the reservoir. Foam 31 applied to the stationary insulated heat reservoir is used to keep buoyant force tension on cable tethers 32 attached between the thermal sink foundation and the stationary insulated heat reservoir to maintain constant depth with the open bottom facing the region of high pressure thermal sink, and ensure axial alignment of the stationary insulated heat reservoir with the mobile device.

Summary of $1^{st}$ stage of operation: Starting at Station A for first pod 28, the descent from Station A to Station B primes the density engine 45 through application of tensile force from the ascent of the second pod 29 transmitted through cable 26 and lower pulley 27 to drag first pod 28 from surface in thermal sink low pressure region 22 to deepest depth in thermal sink high pressure region 23. The first pod 28 has neutral buoyancy as it travels from Station A to Station B and is effectively weightless which reduces the force acting on second pod 29 to only drag force by first pod 28.

Details of $1^{st}$ Stage of Operation:

The first pod 28 at Station A has its thermal tank 2 fully immersed within the stationary heat reservoir 19, with the thermal tank 2 completely filled with high temperature TEF 20.

The first pod 28 at Station A has its phase-change tank 3 fully immersed within thermal sink 7.

The first pod 28 at Station A has its variable volume reservoir 5 contracted to minimum volume and filled with refrigerant 4 in liquid state isolated from thermal sink 7 fluid by the phase-change tank seal 6.

The first pod 28 at Station A is located in the thermal sink low pressure region 22.

The first pod 28 at Station A has neutral buoyancy and is effectively weightless in the thermal sink low pressure region 22.

For the first pod 28 at Station A, the refrigerant 4 pressure and low temperature TEF 24 pressure equal the pressure in thermal sink low pressure region 22.

The first pod 28 is pulled from Station A to Station B by application of tensile force from the ascent of the second pod 29 transmitted through cable 26 and lower pulley 27 as it concurrently ascends from Station C to Station D.

As the first pod 28 travels from Station A to Station B, the phase-change tank seal 6 remains stationary due to the nearly incompressible nature of both the refrigerant 4 and the surrounding thermal sink 7 fluid in liquid state, which do not change volume despite the pressure increase as the first pod 28 moves from the thermal sink low pressure region 22 to the thermal sink high pressure region 23.

No pressure differential exists across the phase-change seal 6 or the thermal sink flow access point 17 on the phase-change tank 3.

As the first pod 28 travels from Station A to Station B, its overall density remains constant and equal to the low temperature TEF 24 density, and therefore has approximately neutral buoyancy both at Station A and Station B locations.

As the first pod 28 travels from Station A to Station B, its remains filled with high temperature TEF 20. The thermal tank 2 is insulated to minimize heat loss from the high temperature TEF 20 to the thermal sink 7 while the first pod 28 travels from Station A to Station B.

Summary of $2^{nd}$ stage of operation: Once first pod 28 reaches Station B the pod is held stationary as a refrigerant 4 phase change occurs between Station B and Station C. The high temperature TEF 20 is circulated from the thermal tank 2 to the refrigerant 4, transferring heat to the refrigerant 4, by means of a heat exchanger 13, boiling the liquid refrigerant 4 to vapor. The refrigerant 4 expands during phase change within the variable volume reservoir 5 and increases the volume of first pod 28. This requires an expenditure of work done on the system, by expelling thermal sink 7 fluid from the phase-change tank 3, and first pod 28 density becomes lower than the surrounding thermal sink 7 fluid which creates positive buoyant force. TEF exiting first pod 28 through the TEF regenerator outlet 15 at lower temperature is dumped to thermal sink 7, and low temperature TEF 24 from the thermal sink 7 replaces the high temperature TEF 20 in the first pod 28 thermal tank 2.

Details of $2^{nd}$ Stage of Operation:

The first pod 28 at Station B is located in the thermal sink high pressure region 23.

As the first pod 28 arrives and becomes stationary at Station B, TEF circulation pump 11 begins pumping high temperature TEF 20 from top of the thermal tank 2 via the thermal tank outlet 10 into the heat exchanger 13.

As high temperature TEF 20 is pumped from the thermal tank 2, a negative delta pressure acts on the thermal tank inlet and check valve 8 which opens the check valve and siphons an equivalent volume of low temperature TEF 24 from the thermal sink 7 into the bottom of the thermal tank 2 replacing the high temperature TEF 20 which was stored in the thermal tank 2.

TEF circulation pump 11 transfers high temperature TEF 20 from the heat exchanger 13, which transfers heat into the refrigerant 4 to complete a phase change of the refrigerant 4 at constant pressure and temperature from liquid at Station B to fully saturated vapor state at Station C.

Thermal tank 2 volume is sized to ensure sufficient high temperature TEF 20 is available to complete phase transition of the refrigerant 4 from liquid to fully saturated vapor state.

TEF pumped by the TEF circulation pump 11 through the heat exchanger 13 enters the regenerator tank 9, pushing an equivalent volume of TEF out of the regenerator tank outlet 15 and into thermal sink 7.

As the refrigerant 4 completes the phase change from liquid to fully saturated vapor, all high temperature TEF 20 has been removed from the thermal tank 2 and replaced with low temperature TEF 24 from the thermal sink 7.

Regenerator tank 9 is used to improve efficiency of the cycle by ensuring that waste heat remaining in the TEF following circulation through the heat exchanger 13 between Station B and Station C cycle transition, which occurs in thermal sink high pressure region 23, is transferred through the heat exchanger outlet and regenerator tank inlet 14 and stored in the regenerator tank 9. This TEF with remaining waste heat is then carried by the first pod 28 during ascent from Station C to Station D, and released through the regenerator outlet 15 between Station D and Station A cycle transition for heat recovery within the stationary heat reservoir 19.

As the refrigerant 4 completes the phase change from liquid to fully saturated vapor it increases temperature and pressure within the variable volume reservoir 5 which moves the phase-change tank seal 6 and pushes surrounding thermal sink 7 fluid out of the phase-change tank 3, through the thermal sink flow access point 17, and into the thermal sink 7 located in the thermal sink high pressure region 23.

As the refrigerant 4 of the first pod 28 completes the phase change from liquid at Station B to fully saturated vapor at Station C, variable volume reservoir 5 is expanded with the high temperature, low density refrigerant 4 vapor, and the overall mobile device 1 density is lower relative to the surrounding thermal sink 7 fluid density, which creates a positive buoyancy force on the first pod 28 at Station C acting in the direction from thermal sink high pressure region 23 to thermal sink low pressure region 22.

Summary of $3^{rd}$ stage of operation: Once the refrigerant 4 phase change to vapor is complete at Station C, first pod 28 ascends from Station C to Station D due to positive buoyancy force which generates mechanical work by the density engine 45 through conversion of buoyant potential energy to buoyant kinetic energy. This work is used to both generate electricity and prime second pod 29. During the ascent from thermal sink high pressure region 23 at Station C to thermal sink low pressure region 22 at Station D, the variable volume reservoir 5 within first pod 28 steadily moves the phase-change tank seal 6 and expands volume against the reducing back-pressure of the surrounding thermal sink 7, allowing thermal sink 7 fluid to be continuously expelled from the phase-change tank 3, steadily increasing the positive buoyant force acting on first pod 28 as it ascends, to a maximum force at Station D.

Details of the $3^{rd}$ Stage of Operation:

The first pod 28 at Station C has its thermal tank 2 fully immersed within the thermal sink high pressure region 23, with the thermal tank 2 completely filled with low temperature TEF 24.

The first pod 28 at Station C has variable volume reservoir 5 filled with refrigerant 4 in vapor state isolated from the surrounding thermal sink 7 fluid by the phase-change tank seal 6.

The first pod 28 at Station C has less density than the surrounding thermal sink 7 fluid within thermal sink high pressure region 23 creating a positive buoyancy force acting on the first pod 28 in a direction from the thermal sink high pressure region 23 towards the thermal sink low pressure region 22.

The buoyancy force acting on the first pod 28 transfers through cable 26 and lower pulley 27 and pulls the second pod 29 in a direction from the thermal sink low pressure region 22 at Station A towards the thermal sink high pressure region 23 at Station B.

For the first pod 28 at Station C, the refrigerant 4 pressure and low temperature TEF 24 pressure equal the pressure in thermal sink high pressure region 23.

The first pod 28 travels from Station C to Station D, concurrently pulling the second pod 29 from Station A to Station B via cable 26.

During this phase of the cycle, power is generated by the first pod 28 transmitting buoyancy force via cable 26 turning the upper pulley 25 which operates the electrical generator 30.

As the first pod 28 travels from Station C to Station D, phase-change tank seal 6 moves unrestricted within the phase-change tank 3, with its resting location dependent on equilibrium pressure between the refrigerant 4 in vapor state within the variable volume reservoir 5 and the surrounding thermal sink 7 fluid.

As the first pod 28 travels from thermal sink high pressure region 23 at Station C to thermal sink low pressure region at Station D, back-pressure exerted on the phase-change tank seal 6 by the surrounding thermal sink 7 fluid steadily reduces and allows the hot refrigerant 4 vapor within the variable volume reservoir 5 to expand further.

As the first pod 28 travels from Station C to Station D, its expanding variable volume reservoir 5 steadily pushes more thermal sink 7 fluid out of the phase-change tank 3 through the thermal sink flow access point 17, continuously decreasing the density of first pod 28 while increasing positive buoyancy force to a maximum in thermal sink low pressure region 22 at Station A.

Once first pod 28 arrives at Station D, the variable volume reservoir 5 is fully expanded with refrigerant 4 vapor at equilibrium pressure with the surrounding thermal sink low pressure region 22, leaving no thermal sink 7 fluid remaining within the phase-change tank 3.

The first pod 28 is guided into the stationary heat reservoir 19 by cable 26 such that first pod 28 thermal tank 2 moves through stationary heat reservoir thermal barrier curtain 21 until the thermal tank inlet and check valve 8 are within the stationary heat reservoir 19 with access to the high temperature TEF 20.

Stationary heat reservoir thermal barrier curtain 21 acts as a thermal barrier to limit transfer of high temperature TEF 20 into the thermal sink low pressure region 22, and also limits transfer of thermal sink 7 fluid from the thermal sink low pressure region 22 into the stationary heat reservoir 19.

Summary of $4^{th}$ stage of operation: Once first pod 28 reaches Station D the pod is held stationary as a refrigerant 4 phase change occurs between Station D and Station A. The low temperature TEF 24 is circulated from both the thermal tank 2, and from the thermal sink 7 to the refrigerant 4, removing heat from the refrigerant 4, by means of a heat exchanger 13, condensing the superheated vapor refrigerant 4 to fully liquid. The refrigerant 4 contracts during phase change increasing density within the variable volume reservoir 5, decreasing the volume of first pod 28. The system expends work on the density engine 45, by filling the phase-change tank 3 with thermal sink 7 fluid. The first pod 28 density becomes equal to the surrounding thermal sink 7 fluid which creates a neutral buoyant force which makes the mobile device 1 effectively weightless. TEF exiting first pod 28 through the TEF regenerator outlet 15 at lower temperature is dumped to thermal sink 7, and high temperature TEF 20 from the stationary heat reservoir 19 replaces the low temperature TEF 24 in the first pod 28 thermal tank 2.

Details of 4$^{th}$ Stage of Operation:

The first pod 28 at Station D is located in the thermal sink low pressure region 22.

As the first pod 28 arrives and becomes stationary at Station D, TEF circulation pump 11 begins pumping low temperature TEF 24 from top of the thermal tank 2 via the thermal tank outlet 10 into the heat exchanger 13.

As low temperature TEF 24 is pumped from the thermal tank 2, a negative delta pressure acts on the thermal tank inlet and check valve 8 which opens the check valve and siphons an equivalent volume of high temperature TEF 24 from the stationary heat reservoir 19 into the bottom of the thermal tank 2 replacing the low temperature TEF 24 which was stored in the thermal tank 2.

TEF circulation pump 11 transfers low temperature TEF 24 to the heat exchanger 13, which removes heat from the refrigerant 4 to begin a phase change of the refrigerant 4 at constant pressure and temperature from superheated vapor at Station D to fully liquid state at Station A.

TEF circulation pump 11 continues to transfer low temperature TEF 24 from the thermal tank 2 until the entire volume of low temperature TEF 24 has been replaced by high temperature TEF 20 from the stationary heat reservoir 19. At this time the diverter valve 12 changes the TEF circulation pump 11 low temperature TEF 24 inlet source from the thermal tank 2 to the thermal sink 7. TEF circulation pump 11 continues to transfer low temperature TEF 24 from the thermal sink 7 until the phase transition of the refrigerant 4 from superheated vapor to fully liquid state is complete.

TEF pumped by the TEF circulation pump 11 through the heat exchanger 13 enters the regenerator tank 9, pushing an equivalent volume of TEF out of the regenerator tank outlet 15 and into bottom of the stationary heat reservoir 19.

As the refrigerant 4 completes the phase change from superheated vapor to fully liquid state it decreases temperature and pressure within the variable volume reservoir 5 which allows the phase-change tank seal 6 to be moved by the surrounding thermal sink 7 fluid entering the phase-change tank 3 through the thermal sink flow access point 17 from the thermal sink low pressure region 22.

As the first pod 28 refrigerant 4 completes the phase change from superheated vapor at Station D to fully liquid state at Station A, variable volume reservoir 5 is fully contracted containing the low temperature, high density refrigerant 4 liquid, and the overall mobile device 1 density with ballast tank 16 equals the surrounding thermal sink 7 fluid density, which creates neutral buoyant force which makes the mobile device 1 effectively weightless at Station A.

The cycle repeats for mobile pods 28 and 29 as long as TEF within the stationary heat reservoir 19 continues to be maintained at highest cycle temperature, TEF within the thermal sink 7 continues to be maintained at the lowest cycle temperature, and the TEF continues to be circulated through the heat exchanger 13 between both Stations D and A, and Stations B and C.

As an example, in the vertical configuration described with regard to FIG. 2, an optimum refrigerant available with open domain data tables is R236EA which may allow operational depth range between 25 and 615 feet within a thermal sink which is ocean water at 12 deg C. The mobile pod travel speed may be limited to approximately 1 foot per second to minimize drag force, and cycle completion for each pod may take over 20 minutes. A single pod sized approximately 3 feet in diameter by 40 feet in length, containing approximately 18 gallons of R236EA refrigerant, operating under these conditions may generate up to 170 kW-Hr/day of electrical power utilizing approximately 50% duty cycle. Approximately 300 tandem pairs of these mobile pods could operate together as a 100 MW power-plant assuming a footprint of less than ¼acre for all heat engine machinery. External heat source temperature required for the refrigerant phase transition is, e.g., 120 deg C, just below the boiling point of ocean water at the operational depth range referenced above. This external heat source temperature may be easily achievable using existing solar thermal hot water panels as well as most industrial or power generation waste heat sources.

In the example implementations, the size of the mobile pods and volume of refrigerant contained directly correlates to the amount of electrical power generated. Larger pod sizes may be used for large power generation applications with access to large external heat sources, operating within open volumes of thermal sink fluid. Smaller pod sizes may be used in small scale building, household, or mobile applications with limited accessibility to smaller external heat sources, operating within closed volumes of thermal sink fluid. Capital and operational cost factors would determine the optimum application of either large numbers of small pods operating together, or a fewer number of large pods acting independently.

In some example implementations, the pod arrangement may be configured to drive a linear generator. Each pod may act independently and in this case the pod may be ballasted to allow both negative and positive buoyancy force to drive power generation either ascending or descending or both directions. Such configuration may be used, e.g., in closed thermal sink volume applications like a drilled well with casing. In these closed thermal sink applications, it may be advantageous for the TEF to be salt brine, coolant, or oil instead of ocean water, to increase density and boiling point of the thermal sink fluid which may improve device efficiency. In addition, these smaller pod size applications may facilitate use of a mechanical plunger instead of electrical circulation pump to circulate the TEF to the refrigerant heat exchanger.

In some example implementations, for instance if device was used to generate electrical power in a mobile application using waste engine heat in the coolant or exhaust, multiple smaller tubes which each contain a mobile pod and thermal sink fluid may be grouped around a central inner axle similar to wheel spokes in a horizontal axis of rotation. These tubes may be filled with engine coolant TEF and act as both radiator and fly-wheel, utilizing the force of air-flow or water-flow acting against the moving vehicle to rotate the thermal sink tubes to both generate a pressure differential within the thermal sink fluid, and cool the thermal sink fluid to surrounding ambient temperature. In this configuration, the mobile pods would generate useful work as they transitioned between Station C on the outer rim of the wheel, towards Station D located on the inner axle due to positive buoyant force. The hot TEF coolant from the vehicle engine would enter the heat reservoir held stationary relative to each rotating tube within the inner axle, and then be carried within each of the mobile pods to the outer rim of the wheel assembly. Upon exiting the pods at the outer rim, it would be cooled and circulated back to the vehicle engine.

Figure 5:
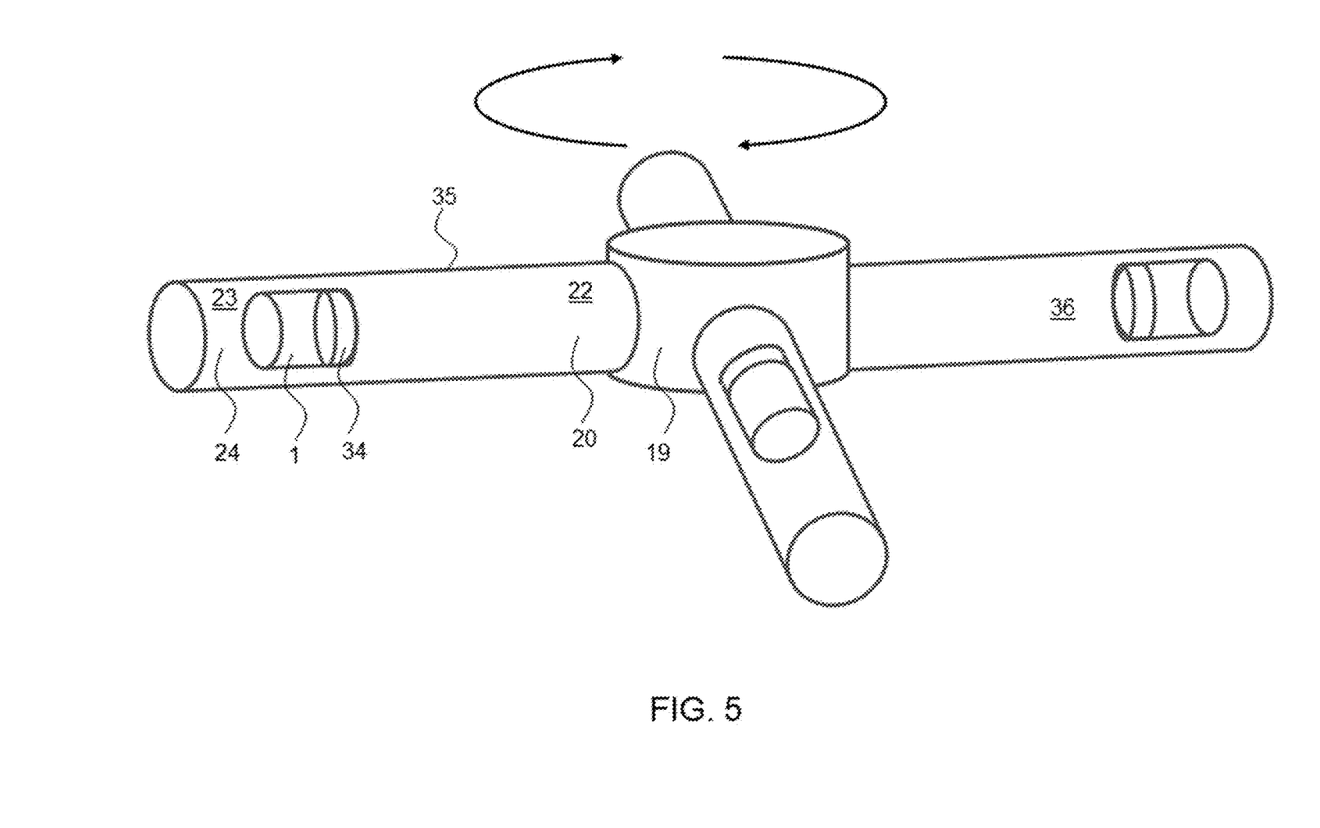
FIG. 5 shows an example of a heat engine device having a horizontal configuration.
Figure 6:
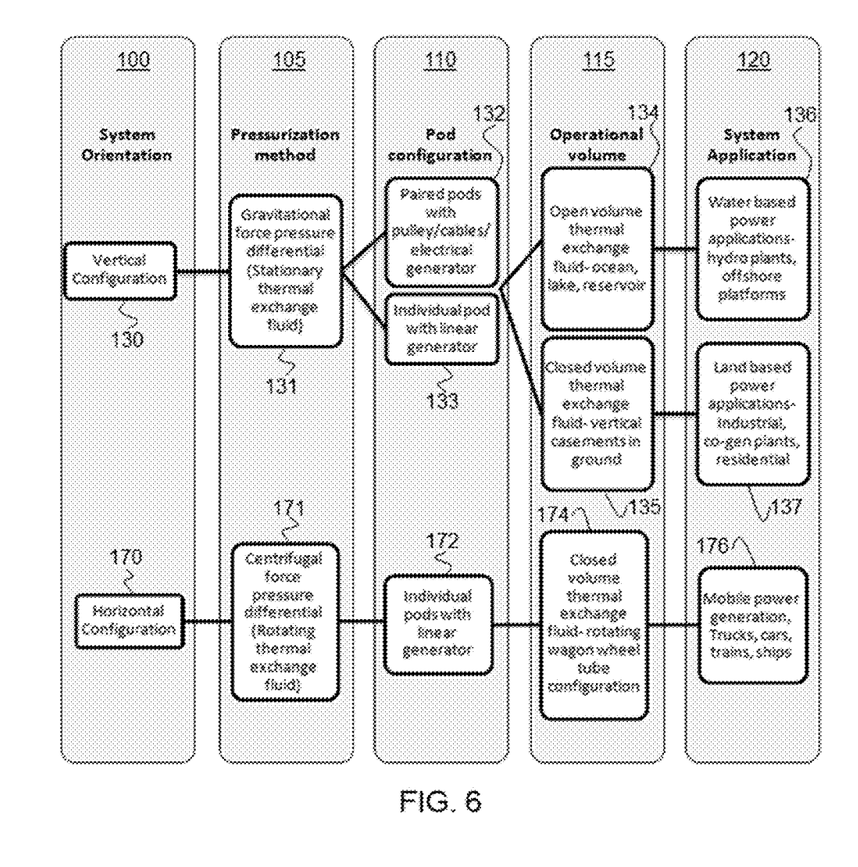
FIG. 6 shows a hierarchal chart of example implementations.

Referring to FIG. 6, the example implementations of FIGS. 1 to 5 are selected from among many implementations. FIG. 6 shows some example variations in system orientation 100, pressurization method 105, pod configuration 110, operational volume 115, and system application 120.

The two system orientations shown in FIG. 6 are a vertical configuration 130 (e.g., the system shown in FIGS. 1 to 4) and a horizontal configuration 170 (e.g., the system shown in FIG. 5).

As shown at 131, an example pressurization method associated with the vertical configuration 130 is gravitational force pressure differential (e.g., where a TEF is stationary). For this pressurization method 131, two example density engine configurations, shown at 132 and 133 respectively, are (a) paired pods with pulley(s)/cable(s)/electrical generator system and (b) one or more pods, e.g., a single individual pod, coupled to a linear generator.

In connection with, for example, density engine configuration 133, some example operational volumes, shown at 134 and 135 respectively, are (a) open volume TEF (e.g., ocean, lake, reservoir, atmosphere) and (b) closed volume thermal exchange (e.g., vertical closed columns such as tubes contained within skyscrapers or in-ground casings).

Example system applications of the open water thermal exchange 134 may include, for example, water-based power applications (e.g., steam electric plants, hydroelectric plants, offshore platforms), as shown at 136.

Example system applications of the closed-volume thermal exchange 135 may include, for example, land-based power applications (e.g., industrial power, building power, residential power), as shown at 137.

As shown at 171, an example pressurization method associated with the horizontal configuration 170 (e.g., the system shown in FIG. 5) is centrifugal force pressure differential (e.g., rotating TEF). For this pressurization method 171, and density engine configuration, shown at 172, includes, for example, one or more pods, e.g., a single individual pod, coupled to a generator, e.g., a linear generator. The mobile device 1 could contain a linear generator 36 comprising a linear generator magnet 34, coupled to a linear generator coil 35 which could be encapsulated to contain the thermal sink 7 as it rotates.

In connection with, for example, density engine configuration 172, a example operational volume, shown at 174, includes, for example, closed volume thermal exchange (e.g., a rotating tube configuration).

Example system applications of the open water thermal exchange 174 may include, for example, mobile power generation (e.g., for trucks, cars, trains, ships), as shown at 176. For example, the fluid tubes may be attraction for rotation by force of movement by the vehicle (e.g., a pelton wheel bucket at end of each tube driven by air or water force acting on vehicle as it moves).

Accordingly, it should be readily apparent that the thermal cycle and fundamental principles of operation described herein may be applied to vertical configurations, horizontal configurations, slanted configurations, or any other suitable configurations. The mobile device or heat exchange apparatus may the same for, e.g., both the paired and individual vertical configurations, which may operate below the surface or above the surface, and may advantageously use salt water or brine as a TEF. The density engine machinery may be different for the horizontal configuration to allow for a smaller size to be used, for example, in mobile applications which would capture waste heat from the engine. In addition, the horizontal application may use the coolant from the engine as the TEF instead of water, and the means by which the device is attached to the electrical generator would more likely be linear generators rather than cable and pulley arrangement. In the horizontal configuration, the pressure differential may be self-generated using a mechanism to spin the horizontal thermal sink tubes and pods.

It should be understood that any pumping mechanism or other operational parameters of the example systems and implementations may be controlled by any suitable control mechanism, e.g., digital and/or analog control systems, and/or mechanical switching mechanisms, which may, for example, function automatically.

In accordance with example embodiments, the temperature and pressure states of the vapor cycle utilized by the density engine may be determined by the following factors:

The highest temperature of the heat source and the lowest temperature of the thermal sink fluid.

The density of the thermal sink fluid and the pressure gradient within this thermal sink fluid; the pressure gradient is derived from gravitational force in vertical configurations, and pressure ratio of cycle is directly correlated to the depth of descent of mobile pod. However in horizontal configurations, the pressure gradient may be generated using centrifugal force derived from rotating the thermal sink fluid around an axis, which allows optimization of the pressure ratio of cycle by controlling both rotational speed as well as the depth of descent of mobile pod.

The boiling point of the TEF at the lowest pressure in the cycle; the TEF which is used to transfer heat to the refrigerant is the same fluid as the thermal sink fluid since this fluid flows freely in a closed loop from heat reservoir through the device heat exchanger to the thermal sink. TEF remains in liquid state at all points in cycle. This requires that the boiling point of the TEF at the lowest pressure in cycle remains higher than the highest temperature point of the cycle. If fresh water is used as the TEF, peak temperature of the cycle is limited to below 100 deg C, assuming the mobile pods were allowed to return to surface of thermal sink reservoir at ambient pressure. This maximum cycle temperature can be increased by limiting the maximum ascent depth of the mobile pods to increase minimum pressure in the cycle, which serves to increase the boiling point of the TEF. There is a trade-off between limiting ascent depth versus accessibility to the high temperature stationary reservoir for the mobile pod at these increased depths. The external heat source needs to be circulated to the high temperature stationary reservoir for the mobile pods at depth, and the increased circulation distance has adverse effects on both thermal and flow losses. Increased cycle temperature can also be achieved through the use of alternative TEF mediums including salt water, brine, coolant, or oil based TEFs which have higher boiling points than fresh water.

The refrigerant type chosen as the working fluid in the cycle; the heat engine device may operate at greater efficiencies by increasing the distance traveled by the mobile pod during the ascent portion of the cycle, and although a variety of high temperature refrigerants may be used for example implementations of the device, the primary selection criteria is maximization of range of mobile pod travel during ascent. The refrigerant needs to remain in stable liquid state at the lowest pressure and lowest temperature in cycle as close as possible to the surface of thermal sink fluid. The refrigerant should be capable of changing phase from liquid to gas at the greatest possible depth of thermal sink fluid at the maximum heat source temperature, without exceeding the critical point pressure of the chosen refrigerant. It should be understood that specific refrigerant composition may be formulated to, for example, optimize device efficiency.

Although the present application describes particular examples and implementations, it should be understood that the present invention is not limited to those examples and implementations. Moreover, the features of the particular examples and implementations may be used in any combination. The present invention therefore includes variations from the various examples and implementations described herein, as will be apparent to one of skill in the art.

What is claimed is:

1. A method for generating energy using a thermal cycle, the method comprising:

heating and maintaining the temperature of a first volume of a thermal exchange fluid at a level greater than the highest temperature of the thermal cycle, the heating provided via an external heat source configured to transfer heat to the volume of thermal exchange fluid when the volume of thermal exchange fluid is disposed within an stationary insulated heat reservoir that is stationary with respect to a thermal sink;

maintaining a temperature of the thermal sink at a temperature lower than the lowest temperature of the thermal cycle, the thermal sink comprising a second volume of the thermal exchange fluid and having a high pressure region and a low pressure region, the stationary insulated heat reservoir being disposed in the low pressure region of the thermal sink;

circulating the thermal exchange fluid between the low temperature thermal sink and the high temperature stationary insulated heat reservoir;

transferring a high temperature thermal exchange fluid from the stationary insulated heat reservoir to an insulated thermal tank of a first mobile device disposed in the low pressure region of the thermal sink;

after transferring the high temperature thermal exchange fluid to the insulated thermal tank, moving the first mobile device along a defined path to the high pressure region of the thermal sink, the movement of the first mobile device being actuated via at least one of (a) a weight of the first mobile device and (b) a corresponding countermovement of a second tandem mobile device from the high pressure region of the thermal sink to the low pressure region of the thermal sink;

after moving the first mobile device to the high pressure region of the thermal sink, transferring at least a portion of the high temperature thermal exchange fluid from the insulated thermal tank of the first mobile device to a heat exchanger disposed in an insulated phase-change tank of the first mobile device, thereby heating a refrigerant disposed in a variable-volume insulated phase-change tank, the heating of the refrigerant causing at least a portion of the refrigerant to change from a liquid phase to a vapor phase, the change of the refrigerant from the liquid phase to the vapor phase causing the volume of the variable-volume insulated phase-change tank to increase, this expansion exerting work on the thermal sink, thereby reducing the density and increasing the volume of the first mobile device to provide a buoyant force to cause the first mobile device to move from the high pressure region of the thermal sink to the low pressure region of the thermal sink;

generating electrical energy from the movement of the first mobile device from the high pressure region of the thermal sink to the low pressure region of the thermal sink;

transferring a low temperature thermal exchange fluid from the high pressure thermal sink to the insulated thermal tank of the first mobile device prior to the first mobile device reaching the low pressure region of the thermal sink; and after the movement of the first mobile device from the high pressure region of the thermal sink to the low pressure region of the thermal sink, transferring at least a portion of the low temperature thermal exchange fluid from the insulated thermal tank of the first mobile device, in addition to some portion of the low temperature thermal exchange fluid heat transfer fluid from the thermal sink to the heat exchanger, thereby cooling the refrigerant to cause at least a portion of the refrigerant to change from a vapor phase to a liquid phase, the change of the refrigerant from the vapor phase to the liquid phase causing the volume of the variable-volume insulated phase-change tank to decrease, thereby reducing the volume and increasing the density of the first mobile device to remove buoyancy force and facilitate movement of the first mobile device from the low pressure region of the thermal sink to the high pressure region of the thermal sink after the high temperature thermal exchange is again transferred from the stationary insulated heat reservoir into the insulated thermal tank of the first device.

2. A system configured to operate according to a thermal cycle, the system comprising:

a thermal exchange fluid;

a heating mechanism configured to heat and maintain a temperature of a first volume of the thermal exchange fluid at a level greater than the highest temperature of the thermal cycle, the heating mechanism including an external heat source configured to transfer heat to a volume of thermal exchange fluid stored within a stationary insulated heat reservoir;

a thermal sink comprising a second volume of the thermal exchange fluid with a pressure differential maintained at a temperature lower than the lowest temperature of the thermal cycle, which encloses the stationary insulated heat reservoir containing high temperature thermal exchange fluid within a low pressure region of the thermal sink, and is configured to allow circulation of thermal exchange fluid between a low temperature thermal sink and the high temperature stationary insulated heat reservoir as part of a closed thermodynamic cycle;

a floatation material applied to the stationary insulated heat reservoir, such as foam or air bladders, used to keep buoyant force tension on cable tethers attached between a thermal sink foundation and the stationary insulated heat reservoir to maintain constant depth with an open bottom facing a region of high pressure thermal sink, and ensure axial alignment of the stationary insulated heat reservoir with a first mobile device;

a curtain of flexible circumferential bristles or flaps extending radially from the perimeter to the centerline of the stationary insulated heat reservoir configured to limit heat transfer between the high temperature thermal exchange fluid stored in the stationary insulated heat reservoir and the low temperature thermal exchange fluid in the surrounding thermal sink through the open bottom of the stationary insulated heat reservoir;

the first mobile device configured to move within the volume of thermal sink fluid via a defined linear path through the pressure gradient between the stationary insulated heat reservoir enclosed within the low pressure region, and some defined depth within the high pressure region determined by the high pressure point of the thermodynamic cycle, the first mobile device including:

an insulated thermal tank configured to carry either, (a) a volume of the high temperature thermal exchange fluid from the stationary insulated heat reservoir in the low pressure region of the thermal sink to the high pressure region in the thermal sink, or (b) a volume of low temperature thermal exchange fluid from the thermal sink in the high pressure region of the thermal sink to the low pressure region in the thermal sink, an insulated phase-change tank of fixed volume which contains a variable volume reservoir capable of minimally restrained volumetric expansion and contraction which acts as a closed boundary between (a) a fixed mass of refrigerant and a heat exchanger configured to transfer heat between a volume of circulating thermal exchange fluid and the fixed mass of refrigerant to induce phase change of the refrigerant between liquid and vapor states, and (b) a volume of the low temperature thermal exchange fluid which enters and exits the insulated phase-change tank from the thermal sink with minimal restraint in inverse proportion to the variable volume reservoir expansion and contraction, an insulated regenerator tank which captures and carries a portion of the volume of thermal exchange fluid exiting the heat exchanger disposed within the insulated phase-change tank between the low and the high pressure regions of the thermal sink for improved efficiency, a ballast tank which is used to ensure that the first mobile device has a net density equal to or greater than the surrounding thermal sink fluid when the refrigerant is in liquid state, while also ensuring that the mobile device has a net density less than the surrounding thermal sink fluid when the refrigerant is in vapor state, a circulation pump configured to circulate the high temperature thermal exchange fluid (a) by pumping from the stationary insulated heat reservoir into the thermal tank in region of low pressure thermal sink, and then (b) by ceasing pumping so that the high temperature thermal exchange fluid remains contained within the thermal tank as the mobile device moves from the low pressure region to the high pressure region of thermal sink, and then (c) by pumping from the thermal tank into and through the heat exchanger disposed within the insulated phase-change tank to complete a phase change of the refrigerant from liquid to vapor, and (d) by pumping lower temperature thermal exchange fluid exiting the heat exchanger through the insulated regenerator tank to the thermal sink, and wherein the circulation pump is also configured to circulate the low temperature thermal exchange fluid (a) by pumping from the thermal sink into the thermal tank in region of high pressure thermal sink, and then (b) by ceasing pumping so that the low temperature thermal exchange fluid remains contained within the thermal tank as the first mobile device moves from the high pressure region to the low pressure region of thermal sink, and then circulate the low temperature thermal exchange fluid (c) by pumping from the thermal tank, in addition to some portion of the low temperature thermal exchange heat transfer fluid from the thermal sink into and through the heat exchanger disposed within the insulated phase-change tank to complete a phase change of the refrigerant from vapor to liquid, and (d) by pumping the higher temperature thermal exchange fluid exiting the heat exchanger through the regenerator tank to the thermal sink;

a closed loop flow path which allows the thermal exchange fluid to pass freely (a) between the regenerator tank of the first mobile device to the low temperature thermal sink, and then (b) from the low temperature thermal sink to the high temperature stationary insulated heat reservoir;

a cable and pulley system configured to transmit the buoyant force acting on the mobile device during ascent between the region of the high pressure thermal sink to the region of the low pressure thermal sink to a generator configured to convert motion to electrical power, and also connects;

a second tandem mobile device, wherein movement of the first mobile device in a first direction along the cable-and-pulley system causes movement of the second tandem mobile device in a second direction along the cable-and-pulley system, the first second direction being opposite the first direction; and a cable stopper attached to the cable above the first mobile device which has a wide diameter designed to catch a cable guide to stop the ascent of the first mobile device when the thermal tank is fully enclosed within the stationary insulated heat reservoir while the phase-change and regenerator tanks remain external to the stationary insulated heat reservoir within the low pressure region of the thermal sink.

3. The system of claim 2, wherein the volume of fluid with a pressure differential is a liquid.

4. The system of claim 2, wherein the generator is a linear generator coupled to the mobile device.

5. The system of claim 4, wherein the linear generator surrounds the mobile device via a thermal sink enclosure.

6. The system of claim 4, wherein the generator is connected to a pump and the generator is powered by the movement of fluid passing over the mobile device as the mobile device moves within the thermal sink.

7. The system of claim 2, wherein the generator is disposed in the mobile device.

8. The system of claim 2, wherein the generator is configured to translate relative movement between the mobile device and any stationary position into electromagnetic power generation.

9. The system of claim 2, wherein the mobile device does not contain a regenerator tank, whereby the thermal exchange fluid is transferred directly from the outlet of the heat exchanger to the thermal sink.

10. The system of claim 2, wherein the heat exchanger comprises thermal exchange fluid contained within a tube enclosed by refrigerant.

11. The system of claim 2, wherein the heat exchanger comprises refrigerant contained within the variable volume reservoir surrounded by thermal exchange fluid.

12. The system of claim 2, wherein the heat exchanger comprises refrigerant contained inside a tube within the variable volume reservoir surrounded by thermal exchange fluid.

13. The system of claim 2, wherein the pressure differential within the thermal sink is generated through the application of gravity in a vertical configuration of the system.

14. The system of claim 2, wherein the pressure differential within the thermal sink is generated though application of centrifugal force generated by rotating a closed volume of the thermal sink in a horizontal configuration of the system.

15. The system of claim 2, wherein the transfer of thermal exchange fluid within the mobile device is generated via at least one plunger acting against at least one container wall of the thermal sink.

16. The system of claim 2, wherein multiple tandem mobile devices are operated together to generate a collective electrical power.

17. The system of claim 2, wherein the ballast tank is used to facilitate cold-start capability of the tandem system by ensuring the first mobile device has a net density less than the surrounding thermal sink with its refrigerant is in liquid state, but maintaining greater net density than the second tandem mobile device with its refrigerant in vapor state.

\* \* \* \* \*